(12) United States Patent
Grueger et al.

(10) Patent No.: US 11,181,420 B2
(45) Date of Patent: Nov. 23, 2021

(54) BENDABLE SUBSTRATE WITH A DEVICE

(71) Applicant: Fraunhofer-Gesellschaft zur Foerderung der angewandten Forschung e.V., Munich (DE)

(72) Inventors: Heinrich Grueger, Dresden (DE); Jens Knobbe, Dresden (DE); Tino Puegner, Dresden (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 148 days.

(21) Appl. No.: 16/396,491

(22) Filed: Apr. 26, 2019

(65) Prior Publication Data

US 2019/0250032 A1 Aug. 15, 2019

Related U.S. Application Data

(63) Continuation of application No. PCT/EP2017/077325, filed on Oct. 25, 2017.

(30) Foreign Application Priority Data

Oct. 28, 2016 (DE) ............ 10 2016 221 303.2

(51) Int. Cl.
| | |
|---|---|
| *G01J 3/02* | (2006.01) |
| *G01J 1/04* | (2006.01) |
| *G01J 1/02* | (2006.01) |
| *G01J 1/16* | (2006.01) |
| *B23K 26/38* | (2014.01) |

(52) U.S. Cl.
CPC ............ *G01J 3/0202* (2013.01); *B23K 26/38* (2013.01); *G01J 1/0252* (2013.01); *G01J 1/0271* (2013.01); *G01J 1/0403* (2013.01); *G01J 1/0477* (2013.01); *G01J 1/16* (2013.01); *G01J 3/0256* (2013.01); *G01J 3/0291* (2013.01)

(58) Field of Classification Search
CPC ...... G01J 3/0202; G01J 3/0205; G01J 3/0256; G01J 3/0291
See application file for complete search history.

(56) References Cited

U.S. PATENT DOCUMENTS

| | | | |
|---|---|---|---|
| 9,851,250 B1* | 12/2017 | Emadi | G01J 3/0291 |
| 2004/0196458 A1* | 10/2004 | Shimizu | G01J 3/02 356/328 |
| 2012/0056205 A1* | 3/2012 | Allard | H01L 27/288 257/84 |
| 2015/0233534 A1* | 8/2015 | Kaiser | G01J 1/0414 250/234 |
| 2016/0313288 A1* | 10/2016 | Theuss | G01N 29/032 |

* cited by examiner

*Primary Examiner* — Michael A Lyons
(74) *Attorney, Agent, or Firm* — Michael A. Glenn; Perkins Coie LLP

(57) ABSTRACT

Described are an apparatus and a method for manufacturing a three-dimensional body comprising mutually oriented devices. In accordance with the invention, a substrate having a first and a second substrate region is provided. A first device is provided in the first substrate region. A second device is provided in the first or in the second substrate region. The substrate is bent along at least one bending edge in order to obtain a three-dimensional body. In accordance with the invention, the first device and the second device are oriented to each other by the bending in order to provide a communications path between the same.

24 Claims, 6 Drawing Sheets

BENDABLE SUBSTRATE WITH A DEVICE

CROSS-REFERENCE TO RELATED APPLICATIONS

This application is a continuation of copending International Application No. PCT/EP2017/077325, filed Oct. 25, 2017, which is incorporated herein by reference in its entirety, and additionally claims priority from German Application No. 102016221303.2, filed Oct. 28, 2016, which is also incorporated herein by reference in its entirety.

BACKGROUND OF THE INVENTION

The invention relates to a method for manufacturing a three-dimensional body by means of a bendable substrate and to such a three-dimensional body, wherein devices between which a communications path is formed by bending the substrate are provided in said three-dimensional body.

Nowadays, a large number of applications are based on or apply optics systems. This particularly applies to cases of very high numbers of pieces produced, like digital cameras, projectors, displays, illumination means or measuring technology applications. They cannot be realized without optics.

When manufacturing optics systems, most different components are applied: lenses, mirrors, prisms, light sources, detectors, filters, gratings, integrated opto-electronical devices, micro-opto-electro-mechanical systems (so-called MOEMS) and the like.

When combining optical and electrical functionalities, various aspects play an important role. Optical beam guiding and electronical functions have to be guaranteed at the same time. In addition, modern applications frequently deal with many or broad ranges of the electromagnetic spectrum. Here, additionally the complex material characteristics and their effects on the system performance, in particular as far as optics are concerned, is to be kept in mind.

The broader or more exotic the wavelengths used, the more problematic become issues of availability of sufficiently transparent materials, sensitive detectors and aberration, in particular chromatic aberration. Multi-spectral systems, i.e. combinations of wavelengths in the UV range, the visible range and the infrared range, seem to be promising but are very complex in terms of optical system realization. Applications in automobiles (like driver assistance systems and the like), cameras in mobile apparatuses, projectors, head-up displays, data glasses and the like can only by launched on the markets successfully when manufacturing same is cheap.

In analogy, comparable approaches for sound waves or ultra-sound waves can be considered. Even when optics systems are exemplarily described below for describing the present invention, it will apply that an acoustic or ultra-sound system may be considered in analogy.

Optics systems the optical paths of which are located along a specific optical axis, so-called "on-axis" systems, can be manufactured efficiently by introducing the components in a molded body or by stacking different units. Most optics for photo and video cameras are large-volume examples of such systems. Mounting tools for efficiently and quickly setting up such systems with a high positioning precision are available. Cameral optics for mobile phones, tablet or laptop computers and other systems, for example, are manufactured in very large numbers.

In many other applications in which the optical path is not along such a specific axis ("off-axis" systems), optics are used. Examples of this are spectral apparatuses, interferometers, telescopes and other off-axis objectives, for example.

When systems of complex, folded or branched optical paths are to be manufactured, the result is high a complexity for mounting and adjusting. With an increasing miniaturization, the adjusting problem also increases and may restrict the feasibility of systems before reaching physical-optical limits (like diffraction limitation etc.).

Complex optics systems having non-linear optical paths, like spectral apparatuses, interferometers, for example, or also off-axis imaging optics, like so-called Schiefspiegler units, are set up using prior-art technologies, predominantly in manufacturing methods. Subsequently, the optical path is adjusted at correspondingly provided locations by suitable devices. This results in high manufacturing complexity which can be justified only with relatively small numbers of pieces produced and a correspondingly high value.

Reducing the size in such systems results in still further increased requirements as regards the adjusting precision and additionally limits miniaturization due to the adjusting problems. In particular, the adjusting elements consume a relatively large amount of space, which in turn counteracts the increasing desire for a reduction in size.

Stacked setups which can be manufactured efficiently (in planar mounting) using automated manufacturing means are known for "on-axis" systems. In some applications, off-axis systems have been realized by stacking groups of elements (see, for example, hybrid spectrometer in DE 10 2008 019 600 A1). However, the applicability is restricted to special cases where adjusting can be achieved by means of the degrees of freedom available when stacking (positioning, turning, setting distances). Apart from the restricted applicability, the complexity (active adjusting, etc.) is considerable. However, planar stacking results in certain restrictions and may consequently entail further costs.

Another way of realizing such systems is introducing different groups of elements in a vertical direction into a pre-formed housing body which allows setting the optical path by means of stops and adjusting means. Mounting here becomes complex, which means that complicated methods and apparatuses are used. Several sub-steps may be used for different mounting directions and an final adjustment may be performed at the end.

A method and groups of elements for being able to quickly, precisely and efficiently manufacture a system having a direct optical path, but also having a complex "off-axis" optical path are desirable.

SUMMARY

According to an embodiment, a method may have the steps of: providing a substrate having a first and a second substrate region, providing a first device in the first substrate region and providing a second device in the first substrate region or in the second substrate region, and bending the substrate along at least one bending edge in order to obtain a three-dimensional body, wherein the first device and the second device are oriented to each other by the bending in order to provide a communications path between the same.

According to another embodiment, a method may have the steps of: providing a substrate having a first and a second substrate region, providing a first device in the first substrate region and providing a second device in the first substrate region or in the second substrate region, and bending the substrate along at least one bending edge in order to obtain a three-dimensional body, wherein the first device and the second device are oriented to each other by the bending in order to provide a communications path between the same, wherein the communications path is an optical path along which electromagnetic radiation or acoustic radiation in the form of waves propagates, wherein the two devices are provided on the respective substrate regions before bending such that, after the bending, the result is an optical path of radiation transmitted between the two devices within the three-dimensional body such that the optical path propagates from the radiation-emitting device along a direct or indirect path to the radiation-receiving device, and wherein bending the substrate results in a three-dimensional body which is closed on all the sides by means of the individual substrate regions.

In accordance with another embodiment, an apparatus may have: a substrate having a first and a second substrate region, a first device provided in the first substrate region and a second device provided in the first or in the second substrate region, wherein the substrate has at least one bending edge and the substrate is bent along said bending edge and consequently is implemented as a three-dimensional body, wherein the first device and the second device are oriented to each other such that a communications path between the same is formed within the three-dimensional body.

According to still another embodiment, an apparatus may have: a substrate having a first and a second substrate region, a first device provided in the first substrate region and a second device provided in the first or in the second substrate region, wherein the substrate has at least one bending edge and the substrate is bent along said bending edge and consequently is implemented as a three-dimensional body, wherein the three-dimensional body which is closed on all the sides by means of the individual substrate regions, and wherein the first device and the second device are oriented to each other such that a communications path between the two devices forms within the three-dimensional body, wherein the communications path is an optical path along which electromagnetic radiation or acoustic radiation in the form of waves propagates, and wherein the communications path propagates from the radiation-emitting device along a direct or indirect path to the radiation-receiving device.

In the inventive method, a substrate is provided. The substrate may, for example, be an essentially planar substrate. The substrate may, for example, comprise a plastic, metal or ceramic. The substrate may, for example, also be a film substrate or a wafer, like a silicon wafer. The substrate comprises at least one bending edge which subdivides the substrate into two substrate regions. This means that the substrate comprises at least a first and a second substrate region. A first device is provided in the first substrate region. A second device is provided in the first substrate region or in the second substrate region. Such a device may, for example, be an optical and/or acoustic and/or (electro-)mechanical (like MEMS) functional element. The device may be an electronic device which is arranged on the respective substrate region in SMD technology, for example, or may also be introduced into the respective substrate region by means of photolithography methods and/or well-known etching methods, for example. The bending edge mentioned before may, for example, comprise a material thickness which is smaller when compared to the thickness of the remaining substrate. A bending edge may, for example, be a trench etched into the substrate or another kind of change in form introduced into the substrate or material removal, for example by means of stamping, perforation, laser cutting etc. However, the bending edge is implemented such that the substrate or, more precisely, the substrate regions can be varied in their relative positions to one another along said bending edge, i.e. can be bent or folded. In accordance with the invention, the substrate is bent (or folded) along this at least one bending edge in order to obtain a three-dimensional body. Thus, a three-dimensional body is formed from the originally basically planar, i.e. two-dimensional, substrate. The invention is, among other things, characterized in that the first device and the second device are oriented to each other by the bending in order to provide a communications path therebetween. In other words, the one or several pre-defined bending edges define the shape of the three-dimensional body. The devices are arranged relative to the bending edges even before bending the substrate such that the devices, after bending the substrate, are oriented correctly to each other. This means that the devices are oriented to each other such that the result is a communications path therebetween. The communications path may, for example, be an optical path along which radiation propagates. This may be electromagnetic radiation or acoustic radiation in the form of waves, like sound waves or ultra-sound waves. Sound waves or electromagnetic radiation, like light of different wavelengths, may be transmitted between the two devices along the communications path. Due to the fact that, even before bending the substrate, the devices are provided on the substrate which, at this point in time, is still an essentially planar substrate, the devices can be provided on the substrate easily in planar technology, for example. Only after providing the devices on the respective substrate regions is the substrate folded, the result being the three-dimensional body where the devices are located. Advantageously, the devices are oriented to each other correctly in the three-dimensional body. However, in known technology, at first the three-dimensional body is provided and, subsequently, the devices have to be mounted in this three-dimensional body in a complicated manner. The inventive method, in comparison, offers a considerably less complicated and considerably more time- and cost-saving alternative to the known technology.

It is conceivable for both devices to be provided on the respective substrate regions before bending such that, after bending, the result is an optical path of radiation transmitted between the two devices, within the three-dimensional body, such that the optical path propagates from the device emitting the radiation along a direct or indirect path towards the device receiving the radiation. The optical path may, for example, be a direct optical path, which means that the radiation impinges on the device receiving the radiation from the radiation-emitting device with no bypasses. However, the optical path may also be deflected within the three-dimensional body, the result being a complex or folded optical path. This complex optical path may be subject to several deflections, i.e. it does not impinge on the device receiving the radiation on a direct path, but an indirect path. In this case, the two devices within the three-dimensional body have to be oriented to each other such that the device receiving the radiation will receive the radiation despite the (multiply) folded optical path, which means that the positioning of the two devices relative to each other is more difficult when compared to a direct optical path. However, using the inventive method, in both cases, the devices can be arranged on the planar substrate such that, after bending the substrate, they will be oriented relative to each other correctly within the resulting three-dimensional body, i.e. such that the optical path emitted by the radiation-emitting device impinges on the device receiving the radiation irrespective of whether the optical path propagates in the three-dimensional body on a direct or indirect path.

It is conceivable for at least one limitation structure to be provided on the substrate, which limits the magnitude of the change in position of the respective bent substrate region when bending the substrate. Such a limitation structure may, for example, be a mechanical stop which limits the bending angle when bending the substrate or the respective part of the substrate.

In accordance with an embodiment of the invention, bending the substrate results in a three-dimensional body which is closed on all the sides by means of the individual substrate regions. This means that the substrate is shaped to form a closed three-dimensional body. In the easiest case, this is a rectangular shape, comparable to a box. A three-dimensional body which is tight relative to the surroundings, i.e., for example, light- and/or sound- and/or gas-tight, is provided easily in this way.

In accordance with an alternative embodiment of the invention, bending the substrate results in a three-dimensional body comprising an opening, wherein said opening is covered by means of a lid separate from the substrate. This means that the substrate is shaped to form a three-dimensional body which comprises at least one opening. In the easiest case, this is a rectangular shape, comparable to a box without a lid. A part separate from the substrate can be used for covering this opening in order to seal the three-dimensional body from the surroundings, for example in a light- and/or sound- and/or gas-tight manner.

In accordance with the invention, at least one opening may be provided in one of the substrate regions, which is implemented such that electromagnetic radiation and/or sound waves may pass in order to provide for an exchange of electromagnetic radiation and/or sound waves between the three-dimensional body and the environment.

It would also be conceivable for at least one opening to be provided in one of the substrate regions, through which gas may be exchanged between the three-dimensional body and the environment, wherein the opening is additionally configured to attenuate and/or prevent light from entering into the three-dimensional body. Here, the opening may, for example, comprise a light gate in the form of a meandering structure. However, the opening may also be covered by means of an element provided with a light-non-transparent coating.

It is also conceivable for a local structure which comprises high thermal conductivity for local cooling or transparency for local light transparency to be introduced into at least one substrate region. This may, for example, be a heat pipe formed in the substrate, a window or an optical gap.

In an advantageous implementation, at least one of the two devices may be formed and/or arranged in the respective substrate section already when manufacturing the substrate by means of planar technology. Planar technology is a well-developed method by means of which the devices may be provided on the respective substrate regions in a quick, easy and cheap manner. Planar technology is of particular advantage when the starting substrate is an essentially planar substrate. Using planar technology, mounting precisions of better than 50 µm or better than 20 µm or even better than 10 µm or better than 5 µm can be achieved.

Embodiments of the invention may provide for the substrate to be processed by means of a laser-based method for separating, perforating, thinning, removing or for locally amending a characteristic. This method is of particular advantage in substrates comprising metals in order to process the substrate in an easy and cheap manner. For example, it is conceivable for the at least one bending edge in the substrate to be introduced into the substrate by means of such a laser-based method. The lasered bending edge may, for example, be a perforated or thinned section introduced into the substrate. Alternatively, or in addition to the bending edge, the substrate may also be processed differently by means of the laser-based method. Exemplarily, openings or holes may be lasered into the substrate, or certain substrate sections may be separated from the substrate.

Another aspect of the invention relates to an apparatus comprising a substrate which comprises a first and a second substrate region. A first device is arranged in the first substrate region. A second device is arranged in the first or in the second substrate region. The substrate comprises at least one bending edge along which the substrate is bent. The bent substrate forms a three-dimensional body. The first device and the second device are oriented to each other by the bending such that a communications path between the two devices forms within the three-dimensional body. This device which can be obtained by the method as mentioned above, correspondingly comprises the same advantages as described before relating to the method.

In accordance with the invention, the individual substrate regions are defined by the bending edges. This means that the bending edges subdivide the substrate into the individual substrate regions. This means that it can be recognized on the substrate itself (i.e. on the front side or the back side of the substrate) what makes an individual substrate region of a substrate.

In accordance with an embodiment of the invention, the individual substrate regions are formed integrally with one another and are in contact with one another at the bending edges. This means that the individual substrate regions are components of the substrate itself. This may, for example, be obtained by introducing the bending edges into the substrate without physically separating the substrate. The three-dimensional body is formed by bending the substrate at these bending edges. This differs considerably from three-dimensional bodies where individual separate substrates are merged to form the three-dimensional body by means of merging processes.

It is conceivable for at least one limitation structure to be provided on the substrate, which limits the magnitude of a change in position of the respective bent substrate region when bending the substrate. Such a limitation structure may, for example, be a mechanical stop which limits the bending angle when bending the substrate or the respective part of the substrate.

In accordance with further embodiments, the two devices may be optical functional elements or micro-mechanical MEMS functional elements or acoustic functional elements. These may, for example, be light-emitting functional elements, like LEDs, which communicate with one another together with light-receiving devices, like photodiodes, along the communications path. Alternatively or additionally, loudspeakers and microphones may be used in order to provide for a sound propagation along the communications path. As a conceivable MEMS functional element, an MEMS mirror, may, for example, be used in order to deflect a light beam, for example, and thus realize a folded optical path.

It would be conceivable for both the devices to be optical functional elements and for a prism to be arranged in an optical path between the two devices. A prism arranged in the optical path may also deflect suitably or spectrally split the radiation in the communications path.

It would also be conceivable for the two devices to be optical functional elements which together form a grating spectrometer or a grating spectrograph or a grating monochromator.

It would also be conceivable for the two devices to be optical functional elements which, when communicating with each other, form an optical off-axis system having a non-linear optical path. In particular with such off-axis systems, the precise orientation of the two devices relative to each other is of decisive importance. In the methods and apparatuses described in known technology, it is difficult to precisely orient the two devices communicating with each other in a three-dimensional body. Here, complicated adjusting steps are used. Since, however, the inventive substrate comprises bending edges, the two devices here may be provided on the substrate in a considerably easier and less complicated manner, even before the substrate is finally shaped to form the three-dimensional body.

It is conceivable for at least one of the substrate regions to comprise an opening, wherein the at least one opening is implemented such that electromagnetic radiation and/or sound waves may pass in order to provide for an exchange of electromagnetic radiation and/or sound waves between the three-dimensional body and the environment.

Alternatively or additionally, it would also be conceivable for at least one of the substrate regions to comprise an opening through which gas can be exchanged between the three-dimensional body and the environment, wherein additionally the opening is configured to attenuate and/or prevent light from entering into the three-dimensional body.

Another embodiment of the invention provides for at least one substrate region to comprise a local structure comprising high a thermal conductivity for local cooling or transparency for local light transmittance. Such a local structure may, for example, be a heat pipe, a window or an optical gap.

BRIEF DESCRIPTION OF THE DRAWINGS

Embodiments of the present invention will be discussed below referring to the appended drawings, in which.

DETAILED DESCRIPTION OF THE INVENTION

Figure 1:
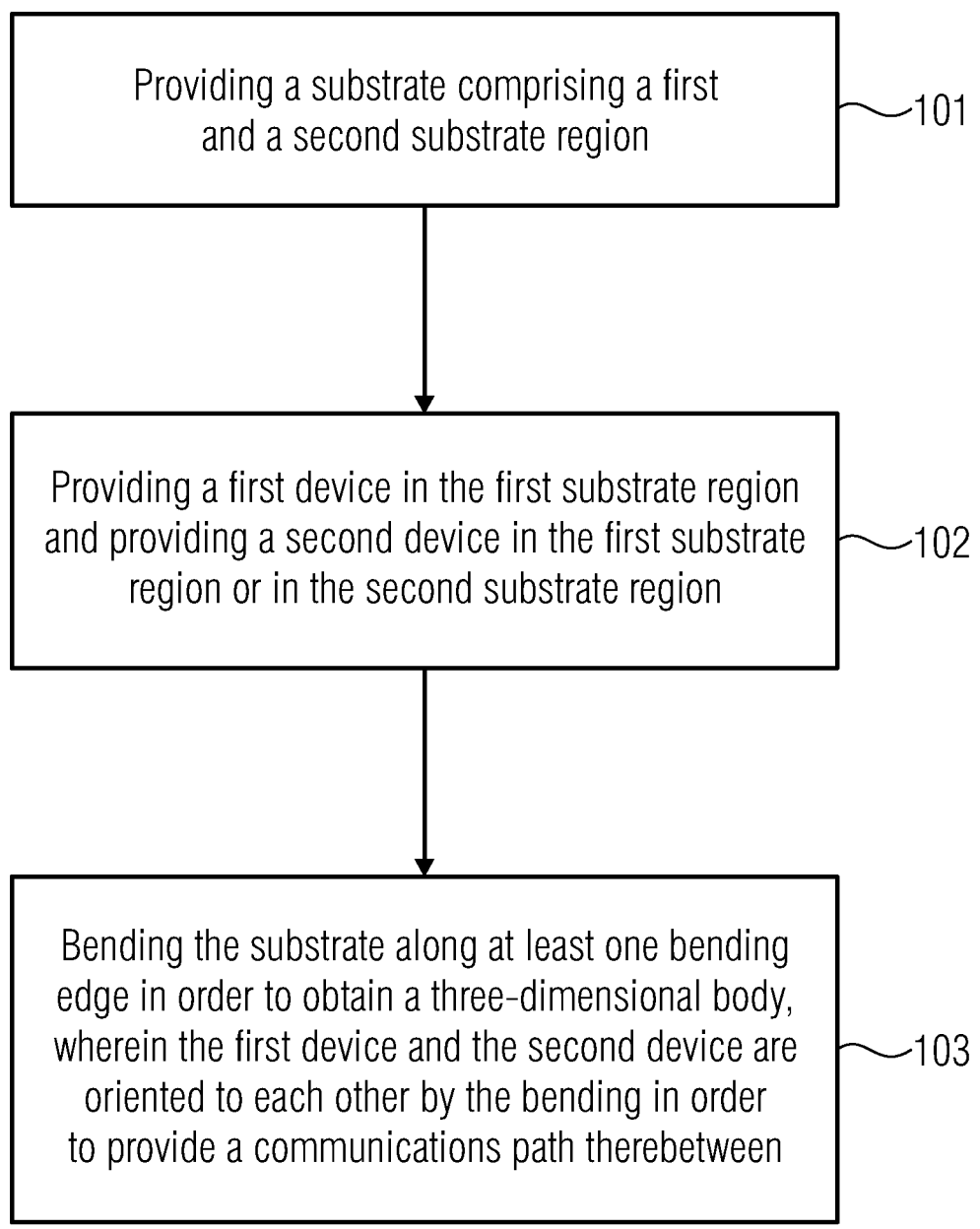
FIG. 1 shows a block diagram of an inventive method.

FIG. 1 shows a block diagram of the inventive method. In block 101, a substrate comprising a first and a second substrate region is provided.

In block 102, a first device is provided in the first substrate region and a second device is provided in the first or in the second substrate region.

In block 103, the substrate is bent along at least one bending edge in order to obtain a three-dimensional body, wherein the first device and the second device are oriented to each other by the bending in order to provide a communications paths between the two devices.

Figure 2A:
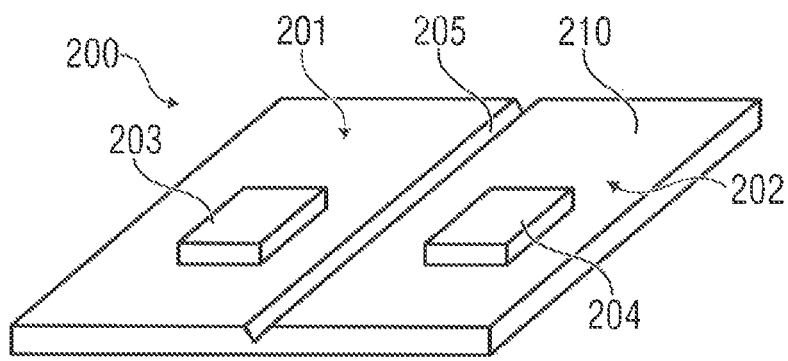
FIG. 2A shows a substrate having devices which, while applying the inventive method, may become an inventive apparatus.
Figure 2B:
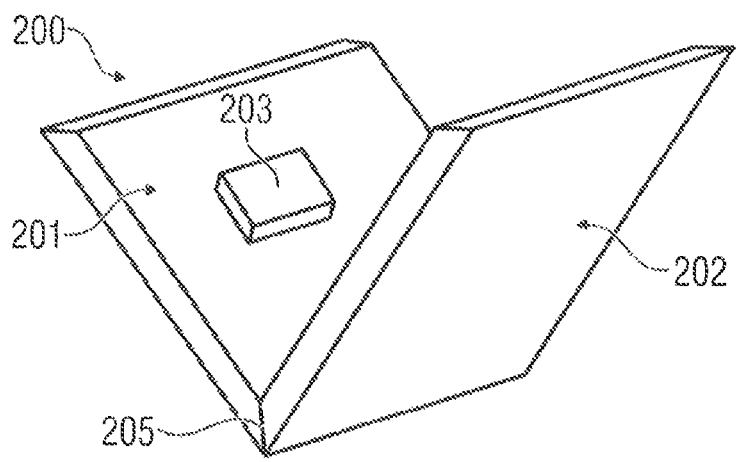
FIG. 2B shows the substrate of FIG. 2*a* bent along a bending edge.
Figure 2C:
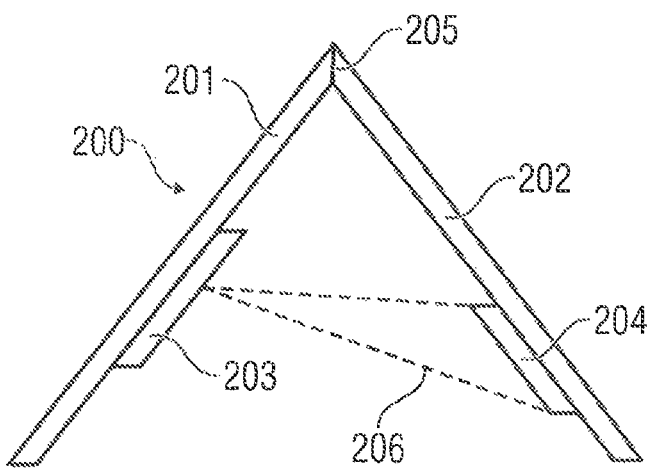
FIG. 2C shows the substrate of FIG. 2*b* rotated by 180°, wherein the devices are oriented to each another such that they form a communications path.

FIGS. 2A, 2B and 2C show an embodiment of an inventive apparatus 200. FIG. 2A shows a substrate 210 which comprises a first substrate region 201 and a second substrate region 202.

A first device 203 is provided in the first substrate region 201. A second device 204 is provided in the second substrate region 202.

The substrate 210 comprises at least one bending edge 205.

As is shown in FIG. 2B, the substrate 210 is bent along this at least one bending edge, the result being a three-dimensional body, in this case exemplarily shaped like a triangle.

FIG. 2C shows the same arrangement, but rotated by 180°. As can be seen in FIG. 2C, the two devices 203, 204 are oriented to each other by bending the substrate 210 along the bending edge 205 such that a communications path 206 between the two devices 203, 204 forms within the three-dimensional body.

The communications paths 206 may be a direct or indirect, like folded, optical path. Waves, like sound waves, or radiation, like electromagnetic radiation in the form of light, can be transmitted in this communications path 206.

Correspondingly, the two devices 203, 204 may be optical functional elements and/or acoustic functional elements and/or micromechanical MEMS functional elements. Exemplarily, the two devices 203, 204 can be optical functional elements which, when communicating with each other, form an optical off-axis system having a non-linear optical path.

In the embodiment shown in FIGS. 2A, 2B and 2C, the first device 203 is a radiation-emitting device and the second device 204 is the radiation-receiving device.

The radiation-emitting first device 203 comprises a specific radiation characteristic, i.e. the radiation is emitted along an optical path 206 characteristic for said device. In this case, this optical path 206 corresponds to the communications path 206 shown in FIG. 2C. In the case of acoustic functional elements 203, 204, the communications path 206 would be the path along which the sound waves emitted by the sound-emitting device propagate towards the sound-receiving device.

As is shown in FIG. 2C, the two substrate regions 201, 202 are oriented to each other such that the communications path 206 forms between the first and the second device 203, 204. This means that the first device 203 emits electromagnetic radiation or sound waves which, depending on the specific radiation characteristic of the first device 203, propagate along the optical path or communications path 206 towards the second device 204.

Expressed differently, the two devices 203, 204 are oriented to each other such that the communications path 206 propagates between the two devices 203, 204 in dependence on the specific radiation characteristic of the first device 203.

Since the two devices 203, 204 in this embodiment are provided on respective substrate regions 201, 202, the orientation of the two devices 203, 204 relative to each other may be influenced by, among other things, the orientation of the two substrate regions 201, 202 relative to each other. According to the invention, the substrate 210 is bent such that the two substrate regions 201, 202 are oriented to each other such that the communications path 206 forms between the two devices 203, 204, i.e. such that the radiation emitted by the radiation-emitting device 203 impinges on the radiation-receiving device 204.

Here, the two devices 203, 204 are provided on the substrate 210 before bending (FIG. 2A) the substrate at defined positions. These defined positions are defined, on the one hand, in dependence on the future resulting shape of the three-dimensional body, i.e. after bending the substrate 210, and, on the other hand, in dependence on the radiation characteristic of the radiation-emitting device 203, 204 mentioned before.

In accordance with the invention, the two devices 203, 204 are provided on the respective substrate regions 201, 202 before bending the substrate 210 such that, after bending the substrate 210, the result is an optical path 206 of radiation transmitted between the two devices 203, 204 within the three-dimensional body such that the optical path 206 propagates from the device 203 emitting the radiation along a direct or indirect path towards the radiation-receiving device 204.

In accordance with the invention, the two devices 203, 204 can be positioned at their respective defined positions on the substrate 210 not yet bent (FIG. 2A) so that the communications path 206 between the two devices 203, 204 results as desired after bending the substrate 210 (FIG. 2C).

The inventive method offers the advantage that the devices 203, 204 can be provided on the substrate 210 not yet bent in conventional planar technology, for example. Exemplarily, at least one of the two devices 203, 204 may be provided at the respective substrate section 201, 202 already when manufacturing the substrate 210 by means of planar technology.

Providing a device 203, 204 on a substrate section 201, 202, in the sense of the present disclosure, means that devices 203, 204 may, for example, be arranged on the respective substrate region 203, 204, for example as an SMD (surface mounted device) or that devices 203, 204 are formed in the respective substrate region 201, 202, for example using photolithography methods and/or etching methods.

As can be seen in particular in FIG. 2A, the individual substrate regions 201, 202 are defined by the bending edges 205. In the embodiment shown here, a single bending edge 205 is shown which subdivides the substrate 210 into the first substrate region 201 and into the second substrate region 202.

The individual substrate regions 201, 202 are formed integrally with each other and are in contact with each other at the respective bending edges 205. In this respect, the inventive device 200 differs from known apparatuses where several individual substrates are merged to form a three-dimensional body.

In silicon substrates, for example, a bending edge 205 may be provided by etching a trench. The trench here is etched only to a depth such that the substrate 210 is not separated physically into two parts. The trench or the bending edge 205 resulting only divides the substrate 210 into two substrate regions 201, 202 which, however, are still formed integrally with each other or integrally with the substrate 210.

FIGS. 3A to 3F show an embodiment of an inventive apparatus 300 comprising more than one bending edge.

Figure 3A:
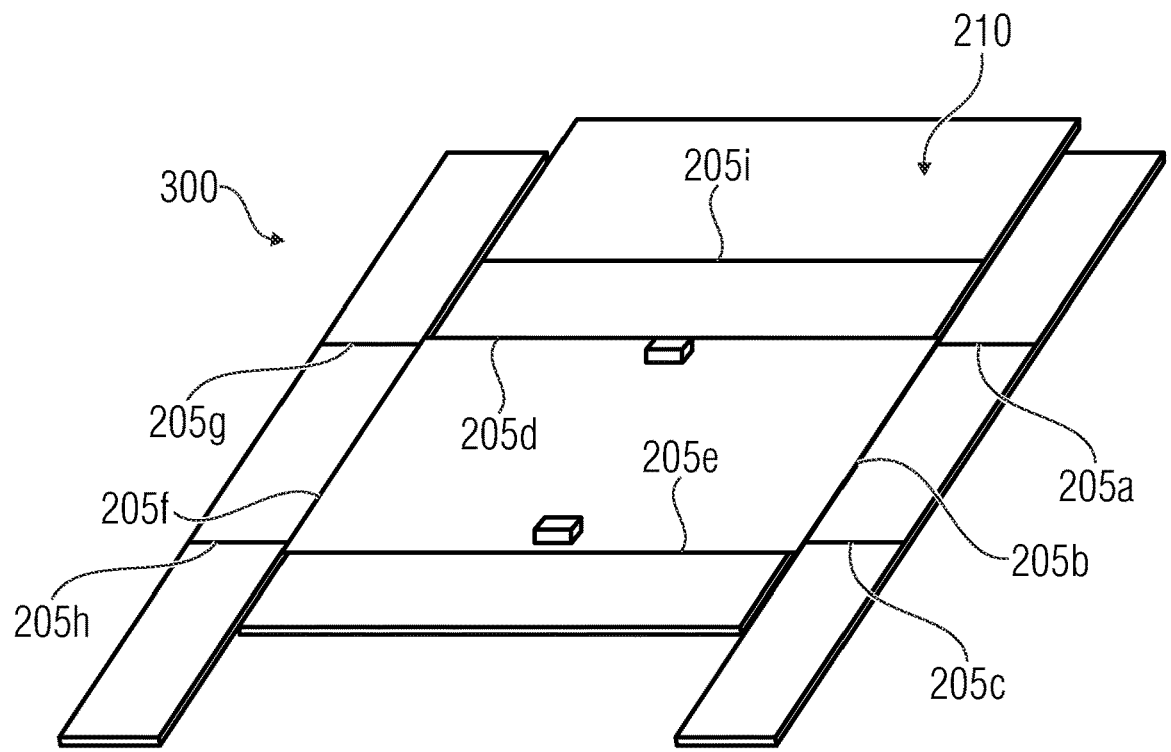
FIGS. 3A-3F show an embodiment of an inventive method having several individual steps, resulting in an inventive apparatus.

FIG. 3A shows a substrate 210 comprising a total of nine bending edges 205a to 205i.

Correspondingly, the substrate 210 is divided into ten substrate regions.

Figure 3B:
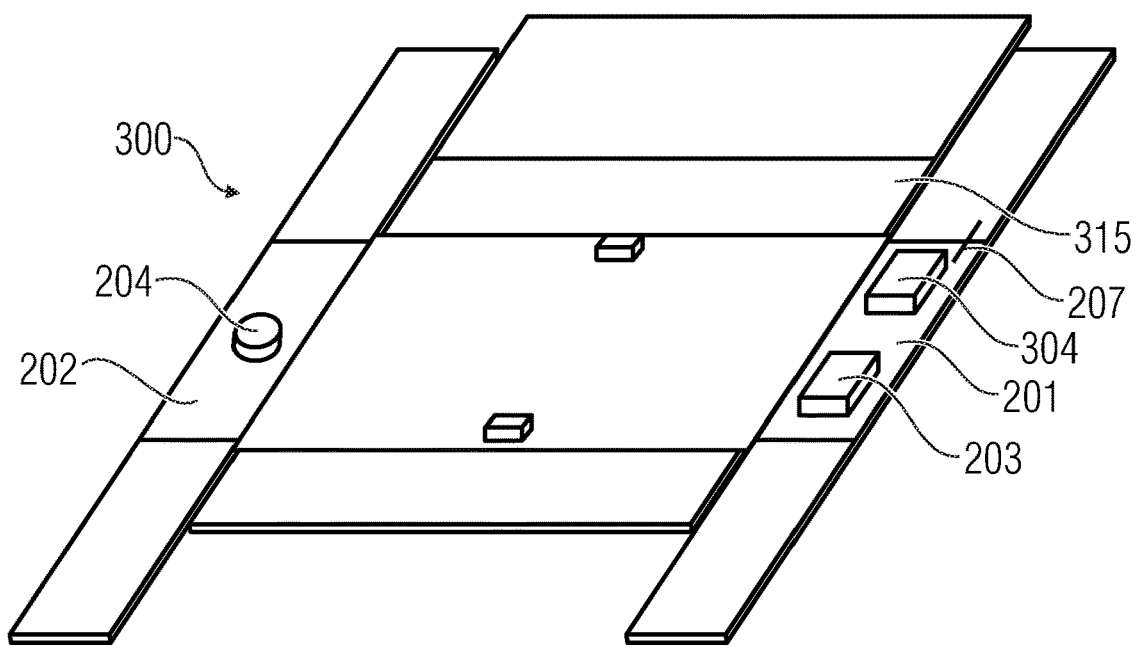

FIG. 3B shows a first device 203 provided on a first substrate region 205, a second device 204 provided on a second substrate region 202, and additionally a third device 304 provided on the first substrate region 201. This means that two devices 204, 304 are provided on the first substrate region 201 and one device 205 is provided on the second substrate region 202.

The first device 203 may, for example, be a radiation-emitting device, like an LED. The second device 204 may, for example, be a radiation-reflective device. The third device 304 may be a radiation-receiving device, like a photodiode.

However, it is also conceivable for no device to be provided on the second substrate region 202. In this case, the two devices 204, 304, i.e. a first and a second device 204, 304, would both be arranged on the first substrate region 201. If the substrate 210 had, for example, reflective characteristics, the reflective device 205 provided on the second substrate region 202 could be omitted, and the first and the second device 204, 304 could be provided on the same, i.e. on the first, substrate region 201.

Figure 3C:
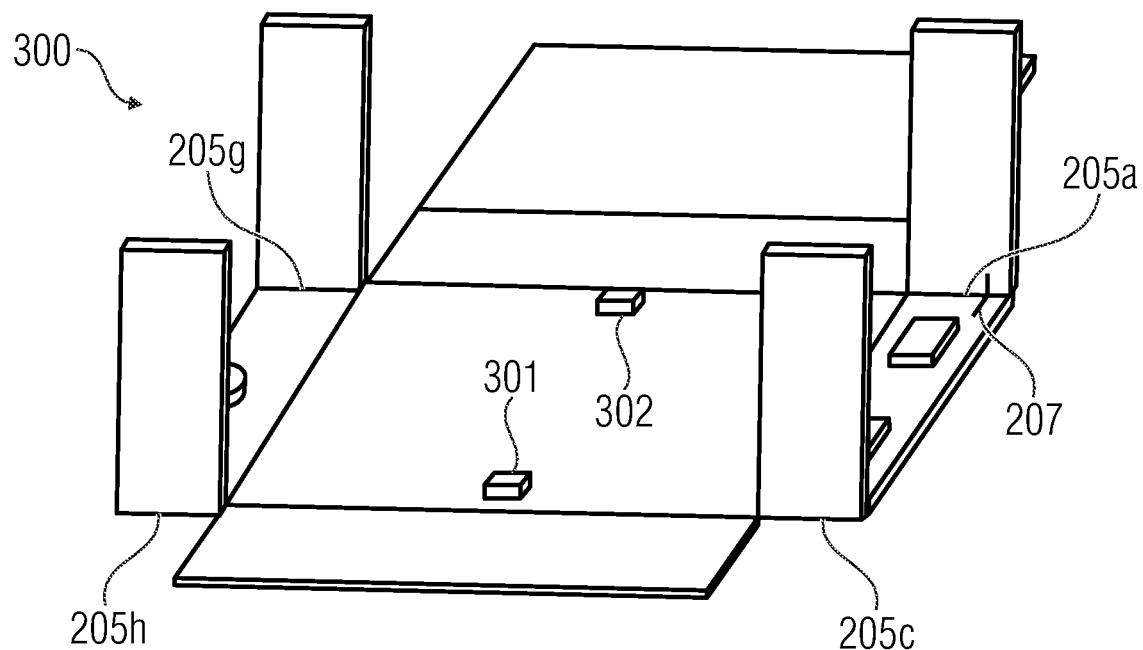

FIG. 3C shows how the substrate 210 can be bent. Here, at first the substrate sections are bent along the bending edges 205a, 205c, 205g, 205h.

Figure 3D:
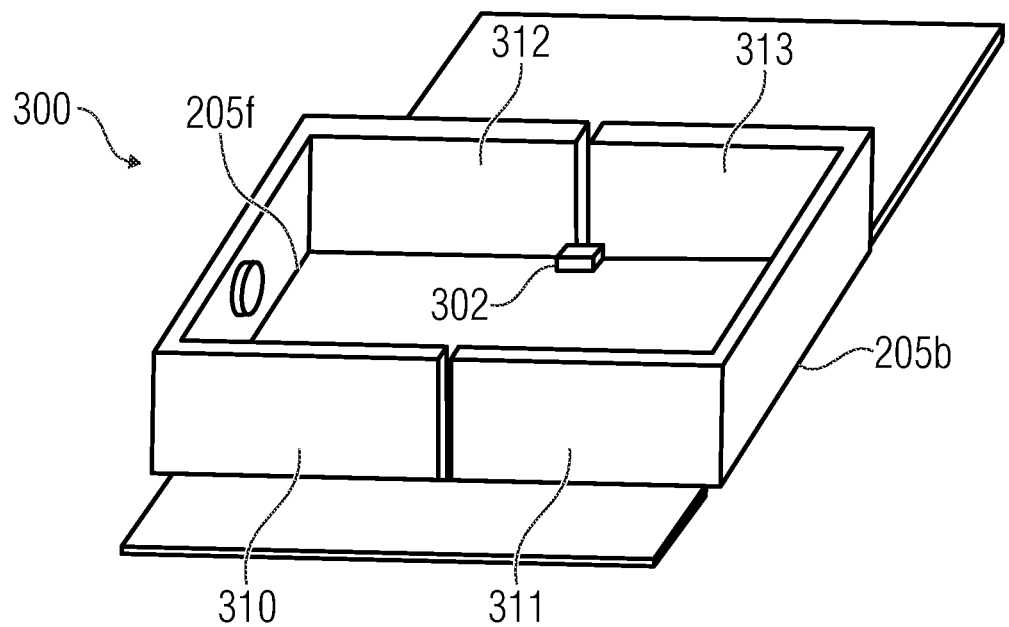

In FIG. 3D, the substrate sections are bent along the bending edges 205b, 205f.

FIGS. 3C and 3D additionally show limitation structures 301, 302. The limitation structures 301, 302 are also provided on the substrate 210, wherein these, when bending the substrate 210, limit the magnitude of the change in position of the respective bent substrate region.

The limitation structures 301, 302 here are exemplarily implemented as mechanical stops. The limitation structures 301, 302 limit the change in position of the bent substrate regions 310, 311, 312, 313 to the inside.

Figure 3E:
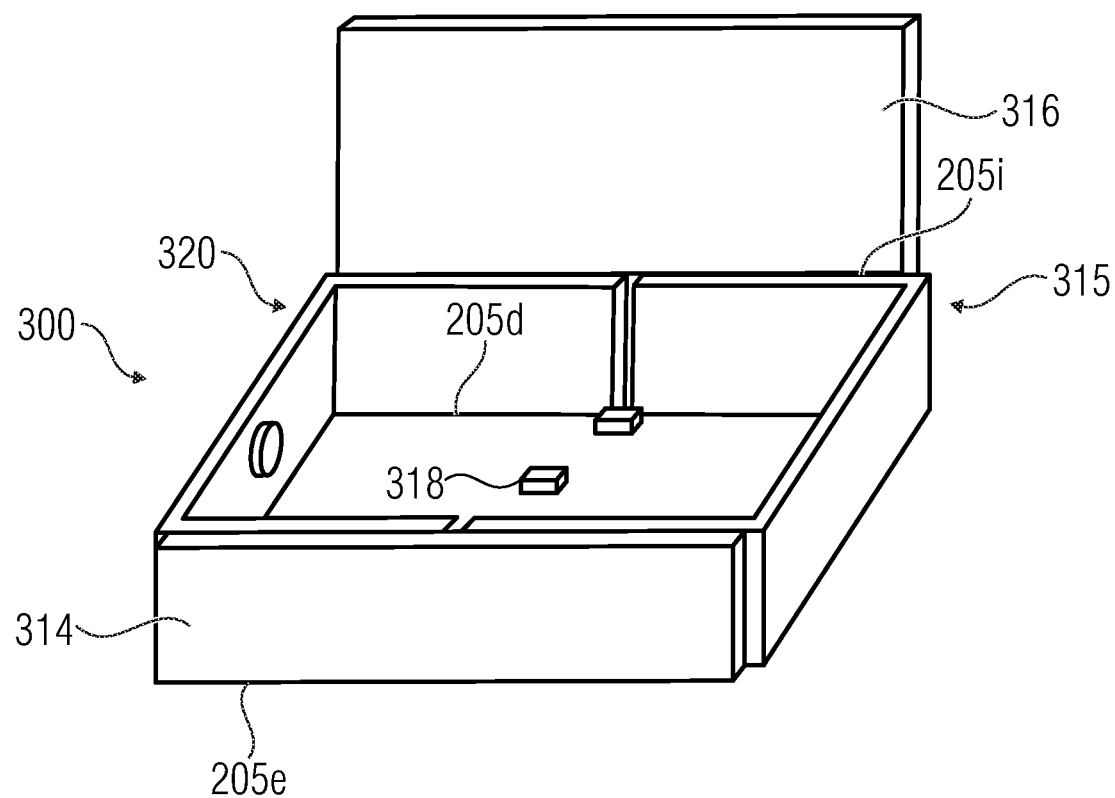

In FIG. 3E, the substrate region 313 is bent along the bending edge 205e and the substrate region 315 is bent along the bending edge 205d.

Thus, the result in FIG. 3E, due to bending the substrate 210, is a three-dimensional body comprising an opening 320. This means that the three-dimensional body is closed by means of the substrate sections on all its sides, except for at least one side. The three-dimensional body here is comparable to a box without a lid.

The opening 320 may be closed, if applicable, using a lid, wherein the lid may be implemented to be an element separate from the substrate 210.

Figure 3F:
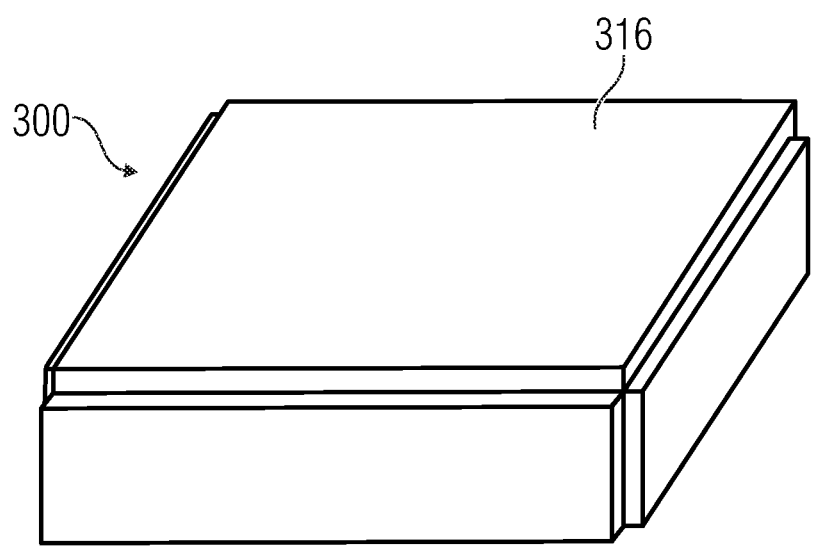

As can be seen in FIG. 3F, the substrate 210 may comprise another substrate region 316 by means of which the opening 320 mentioned before can be closed. In this embodiment, bending the substrate 210 along the bending line 205i results in a three-dimensional body which is closed on all the sides by means of the individual substrate regions.

Figure 4:
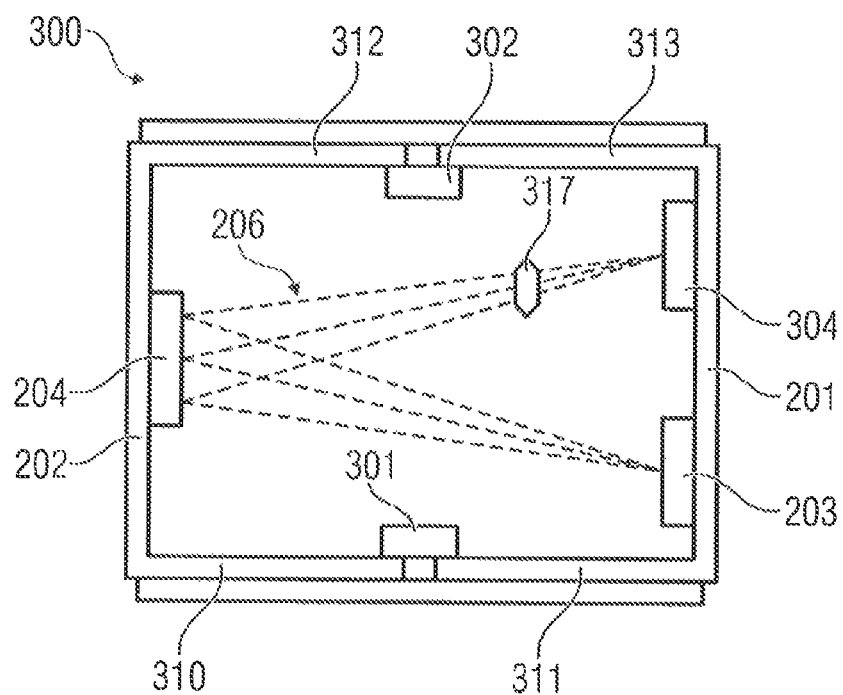
FIG. 4 shows a top view of an embodiment of an inventive device.

FIG. 4 shows a top view of the apparatus of FIG. 3E. On the one hand, the limitation elements 301, 302 which form a mechanical stop for the substrate regions 310, 311, 312, 313 can be recognized.

Additionally, the devices 203, 204, 304 can easily be recognized in FIG. 4. A radiation-emitting first device 203 and a radiation-receiving second device 304 here are both provided on the first substrate region 201.

A reflective device, like an MEMS mirror, is arranged on the second substrate region 204. The radiation-emitting device 203 emits radiation. The radiation emitted impinges on the reflective device 204. The reflective device 204 reflects the radiation such that the same impinges on the radiation-receiving device 304.

Thus, an optical path or communications path 206 forms between the radiation-emitting device 203 and the radiation-receiving device 304.

In contrast to the embodiment shown in FIG. 2C, the communications path shown in FIG. 4, however, is an indirect communications path since it is reflected at the reflective device 204 and consequently is not guided on a direct path from the radiation-emitting device 203 to the radiation-receiving device 304.

Additionally, a prism 317 may be arranged in the optical path or communications path 206 in order to correspondingly deflect the radiation if applicable.

Figure 5:
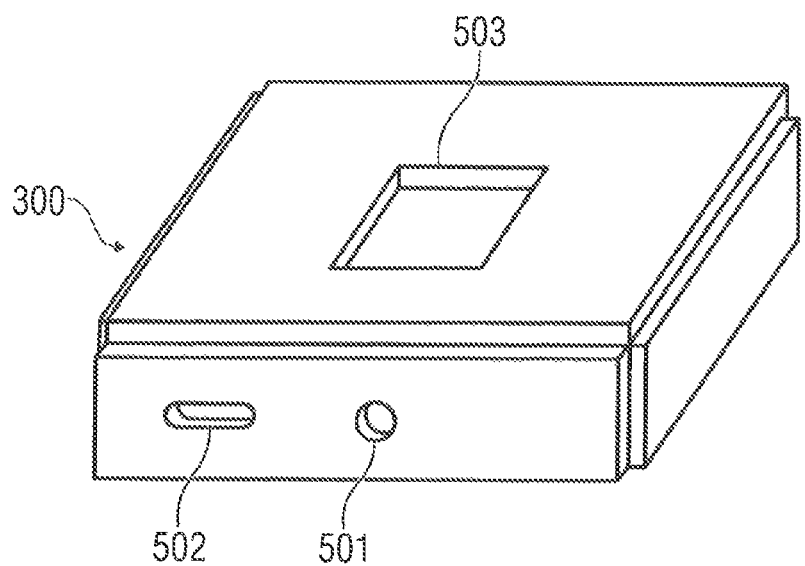
FIG. 5 shows a perspective view of an embodiment of an inventive apparatus.

FIG. 5 shows another embodiment of an inventive apparatus 300. The apparatus 300 shown here comprises at least one opening 501 which is formed in one of the substrate regions. This at least one opening 501 is implemented such that electromagnetic radiation and/or sound waves may pass in order to provide for an exchange of electromagnetic radiation and/or sound waves between the three-dimensional body and the environment.

Gas can be exchanged between the three-dimensional body and the environment through said opening 501, or alternatively through at least one other opening 502, in one of the substrate regions. The opening 501, 502 may be configured to attenuate and/or prevent light from entering into the three-dimensional body.

The embodiment of the inventive apparatus 300 shown in FIG. 5 additionally comprises a substrate region where a local structure 503 is introduced which exhibits transparency for local light transmissivity. This may be a simple opening or a window. The window 503 may at least partly reflect incident light, like by means of a special coating, so that only certain wavelength ranges may enter into the three-dimensional body.

The local structure 503 may also be implemented as a structure of high thermal conductivity for local cooling, like as a heat pipe.

Some examples which can be realized by means of the present invention will be mentioned below.

a) NDIR Gas Analysis System

Frequently, a light source having two filters and corresponding detectors are combined for applications in gas analysis. Various setup variations of different complexity are available. Of relevance is a light distance by means of which the specific absorption of a gas, like carbon dioxide, in the air is detected.

In one arrangement in accordance with the invention, a substrate is provided in which a respective sub-area at a rectangular basic area is arranged at two respective opposite sides. The light source, the detectors, the filters and, if applicable, passive reflectors are mounted in planar technology as mentioned at the two parts at the short sides of the rectangle.

Subsequently, the lateral areas provided at the long edges are folded up and their edges form the stops representing the final position for the short edges. These are folded up and abut on the stops at exactly 90° so that the areas are opposite to one another within small tolerances and the optical path from the light source to the opposite filter detector unit is adjusted automatically.

Alternatively, a variation may be realized where the light source and the filter detector unit are realized on an area and a mirror is arranged on the opposite side.

The system is closed and sealed by mounting a lid which is provided either as a separate element or in connection with a correspondingly implemented area of the substrate.

b) Near-Infrared Spectrometer—First Variation Hybrid Spectrometer

The Fraunhofer IPMS institute has developed an MEMS-based grating spectrometer having the format of a sugar cube. This system is based on the idea of merging a stack of planar or partly planar substrates. The availability of quick mounting machines for realizing microsystems made of a stack of planar substrates assists such developments which are successfully used, for example for manufacturing cameras for mobile phones in large numbers. Important restrictions and, consequently, costs when realizing the individual substrates are entailed with a planar or partly planar implementation. The advantages of the quick and cheap mounting technology are partly consumed by the costs of the individual substrates. Additionally, there are cases where systems, like grating spectrometers, are not accessible due to the planar or partly planar restrictions of such a realization.

The inventive solution also allows manufacturing micro spectrometers having complex optical paths. When compared to the substrate stack as mentioned before, the present invention allows considerably increasing the numbers of pieces obtainable and considerably reducing the manufacturing costs.

A correspondingly provided substrate comprises suitable bending edges and stops for setting the angles. The MEMS chip units (having the input gap, MEMS grating and exit gap) are mounted above the detector on one side of the substrate. The mirror device (collimation mirror and refocusing mirror, either two elements or commonly realized in a semi-finished product) are mounted on the other side in planar technology.

Subsequently, the pre-manufactured side walls are folded up and, due to the stops, form precise angles to the base area. The lid closes the casing, fixes the folded-up components and prevents stray light and mechanical contamination from entering.

Of advantage is the easy implementation having a rectangular base area and the rectangular setup. However, high requirements apply to the topology of the mirrors (generally biconical off-axis mirrors are used) in order to achieve a reasonable imaging performance.

c) Near-Infrared Spectrometer—Second Variation Czerny-Turner Arrangement

The original implementation of a Czerny-Turner spectrograph obtains a reasonable imaging performance by using rotation-symmetrical spherical mirrors, wherein, however, the grating is tilted strongly. For reasons of technology, this is not possible using the approach of embodiment b) mentioned above.

An MEMS-based spectrometer having an arrangement, as described by Czerny and Turner, can be realized by implementing the grating and the gaps as separate elements.

The substrate comprises corresponding bending edges and stops for setting the angles. The elements of input gap, collimation mirror, MEMS grating, refocusing mirror, exit gap and detector are mounted in planar technology. Subsequently, the pre-manufactured side walls are folded up and, due to the stops, form precise angles to the base area.

The position of the grating can be set by selecting the bending edge such that it is optimum for the function of the spectrometer. The lid closes the casing, fixes the folded-up components and prevents stray light and mechanical contamination from entering.

Adjusting the system is limited to calibrating the wavelength scale which may take place during the manufacturing final check, wherein the digital calibration file may easily be stored in a non-volatile memory of the system.

Of advantage is the simple (cheap) setup of the mirrors. However, an increased mounting and adjusting complexity is entailed, which may result in potential limitations of the performance of the system due to imprecision when mounting.

d) Near-Infrared Spectrometer—Third Variation 2D Scanning Grating Arrangement

In another embodiment of a near-infrared spectrometer, a novel chip is used in which the movable grating is manufactured in a frame realized in the chip, which in turn can be deflected uniquely relative to the remaining chip by a corresponding structure.

The MEMS chip consequently comprises the two gaps and the movable grating provided in the frame. Orienting the gaps and the grating is performed by means of the lithography of the manufacturing process with highest precision.

Apart from the bending edges and stops, the substrate also comprises a structure projecting from the plane and implemented such that, when mounting the MEMS chip, the frame with the grating arranged therein is permanently pre-deflected by an angle specifically selected for the spectral range.

Alternatively, this structure may be implemented to be adjustable or even adaptable during operation, which allows a significantly extendable function (like calibration of the wavelength range or even adjustability of the wavelength range) with somewhat increased complexity.

The remaining manufacturing process corresponds to the previous embodiments, wherein rotation-symmetrical spherical mirrors may in turn be sufficient for obtaining a good imaging performance.

Of advantage are the easy adjusting and manufacturing of the system. However, the complexity when manufacturing the MEMS devices is somewhat higher.

e) Schiefspiegler Camera

In the field of imaging systems, apart from axially arranged lens systems and corresponding mirror optics having central shadowing, off-axis optics pursuant to the Schiefspiegler principle named by Anton Kutter may be realized using the present invention.

They are of advantage in that the purely reflective arrangement avoids chromatic aberration and absorption by the lens material. The image distortion can be corrected by means of corresponding algorithms when using digital detectors. A correction with sub-pixel precision is possible here.

Using known approaches, the folded optical path entails high complexity when manufacturing the system components, mounting and adjusting the system.

Using the inventive solution, it is possible to set the complex optical path by means of correspondingly implementing the positions of the bending edges. The respective mirrors (typically four) are mounted at the intended location in planar mounting. Additionally, the detector and, if applicable, an entry window are mounted in front of the corresponding opening of the substrate. Implementing the areas of the substrate is performed such that not only the areas and stops can be ensured securely, but also the light-tight sealing of the system.

f) Multi-Spectral Camera

The camera described in embodiment e) pursuant to the Schiefspiegler principle exhibits the great advantage that the mirror optics suppresses the chromatic aberrations and spectral absorptions conventional for lens systems. This allows addressing very broad spectral ranges.

In a particular inventive implementation of a "multi-spectral camera pursuant to the Schiefspiegler principle", several detectors may be used in parallel in order to address greater a spectral range than is possible using a single detector.

In a prior-art test system, a high-resolution area detector for the visible spectral range was combined with a second area detector for heat images (thermal infrared). Due to the beam splitter and the additional detector, the setup becomes more complex and the test system is comparably large.

However, using the inventive solution, a compact system can be provided which can be manufactured efficiently and cheaply, even for large numbers of pieces.

g) Interferometer

In numerous system approaches and variations of implementations, the interference of light is used for system functions. The setup of interferometers, as regards adjustment, is particularly sensitive since the beams are to be as congruent as possible. Using the inventive solution, different types of interferometers can be set up.

In the easiest case, the substrate is realized as a network of cubes which comprises additional areas for the respective stops. A beam splitter, implemented as a cube, for example, is mounted in the center, two sides are provided with mirrors, one of which may be modulated, one side is provided with an input aperture and the fourth side with a detector.

After folding, the direct result is the interferometer which may exemplarily be used for spectrally analyzing the light by means of a Fourier Transform (so-called FT spectrometer).

h) Hyper-Spectral Camera

In applications for material recognition or sorting, so-called hyper-spectral line cameras are frequently used. The setup of such a system may advantageously be in the inventively described manner.

i) Tunable Light Source

Another complex optics system is a tunable light source. Adapted variations of implementations of this light source may also be realized instead of a stack of substrates in the inventively described manner.

Of advantage here is using standard units, in particular as regards the grating, which entail additional complex mounting, but may be of advantage as regards availability and variability.

j) Laser Projector and Head-Up Display

A projection unit may be set up using one or several modulatable light sources having a tight beam profile, advantageously laser and means for deflecting the laser beam (exemplarily a 2D scanner mirror or a combination of two 1D scanner mirrors).

Due to the optical characteristics, this is particularly advantageous for so-called head-up displays. Such applications are highly sensitive as regards adjustment, in particular in relation to the beam combination of light sources and scanner mirrors.

For minimizing image errors, in particular conical image distortion, the steepest possible angle of incidence is of advantage. This uses a complex three-dimensional beam path.

Such an arrangement may be realized with particular advantage using the inventive solution.

k) Prism Spectrograph

Prism spectrographs are frequently wrongly estimated as being obsolete. In particular for very high manufacturing volumes, modern manufacturing technologies offer potential system approaches which may be of advantage as regards the manufacturing costs.

Systems which, due to the efficient manufacturing, can be produced extremely cheaply are possible using the inventive solution.

l) Further Examples of Application

In further examples of application, acoustic or ultrasound-based systems are, among others, also conceivable instead of the optical systems described before. Of relevance here is the propagation of a form of energy (like light, electromagnetic radiation, sound, ultra sound, other waves, etc.) along a more or less distinct direction which then passes along a path, experiences or effects an interaction and is then measured again. The number of possible examples of application is infinite; numerous further examples of application are conceivable.

Embodiments, like prism binoculars or a periscope, which can do without any electrical function, for example, would be conceivable.

This means that the invention, among other things, describes a method of producing a three-dimensional body from a planer substrate by means of molding bending edges and separating along edges provided by means of folding. A particularly high precision and shape stability can be obtained by correspondingly provided stops, without having to provide for additional stabilization by means of merging or gluing methods. For illustration purposes, this may roughly be compared to shipping boxes of logistics companies. However, in the invention, the dimensions are considerably smaller so that considerably more delicate bending edges have to be provided which cannot be compared to conventional cardboard boxes.

Modern manufacturing technologies for plastics and other potential substrate materials allow precisions of better than 10 µm. Molding methods, for example, can provide planar work pieces with preliminary bending or separating edges highly efficiently in large numbers. The position of such edges can be selected as desired so that not only rectangular bodies can be realized. The precisions obtainable, with system dimensions in the range of centimeters, are 1:1000, which is sufficient for adjusting many optics systems.

Mounting tools for placing groups of elements on planar or approximately planar substrates are available, the positioning precision of which may be less than 1 micrometer.

Thus, the invention offers a way of manufacturing a complex optics system easily by means of a suitable substrate and a corresponding manufacturing flow. Large numbers of pieces can be provided cheaply using the present invention.

A planar or at least approximately planer substrate can be implemented inventively such that, after mounting the devices by means of a corresponding mounting tool, sub-regions can be tilted along provided lines/edges (like provided in the substrate or characterized particularly, bendable, etc.). In addition, desired tilting angles and positions may be produced mechanically by means of stops, without entailing adjustment.

An advantage of the present invention is the fact that the (folded/complex) optical path forms autonomously.

In summary, the invention offers the advantage of realizing "off-axis" optics system having a complex optical path by simple mounting by means of a planar mounting apparatus and of produced the optical path such that the result is the smallest possible adjustment complexity where the system adjusts itself during manufacturing or very easy (automatable) adjusting steps are sufficient for setting the optical path.

Expressed in somewhat more general words, the invention may be implemented in the following embodiments. These embodiments may be combinable with any implementation claimed in the claims, wherein the apparatus claimed will subsequently also be referred to as system or optical system or optics system.

Embodiment 1

System and method for manufacturing the same, characterized in that a plurality of components are mounted on a planar or approximately planar substrate, the components comprising an optical, electrical, mechanical or acoustic function, the substrate is transferred to a three-dimensional arrangement by means of devices provided, like separation lines, bending edges, stops or the like, such that at least two components are in a mutual relation which is relevant for the system function, and set autonomously so that no adjustment or at most minor post-adjustment is entailed.

This means that:
a substrate is produced which provides for advantageous edges for bending sub-regions of the substrate
further structures having the function of setting certain angles when bending sub-regions, a plurality of devices having an optical function, like mirrors, gratings, lenses, aperture limitations (gaps, pin holes), detectors, beam splitters, filters; a mechanical, electrical function, like MEMS components, or an acoustic function are placed on the substrate
openings may be provided in the substrate, the openings transmitting electromagnetic radiation or sound waves
after bending the sub-regions, the optical path is set autonomously or by minor post-adjustment Embodiment 2

System in accordance with embodiment 1, wherein the precision of the arrangement is specified qualitatively or even quantitatively, like the optical path not exceeding the respective limitations of the components. The mounting precision is better than 50 µm/20 µm/10 µm/5 µm—or, in analogy, for the angles of the optical paths.

Embodiment 3

Optical system in accordance with embodiment 1 or 2, in the form of an optical system having a non-linear optical path or optical system having a complex, non-linear optical path or off-axis system.

Embodiment 4

System in accordance with any of the preceding embodiments, comprising edges and stops configured for setting positions with a precision of better than 50 µm/20 µm/10 µm/5 µm.

Embodiment 5

Optics system in accordance with preceding embodiments, wherein the optics system is a grating spectrometer or a grating spectrograph or a grating monochromator.

Embodiment 6

Optics system in accordance with preceding embodiments, wherein the optics system contains a prism.

Embodiment 7

Optics system in accordance with preceding embodiments, wherein an interference is generated by electromagnetic radiation.

Embodiment 8

Optics system in accordance with preceding embodiments, wherein at least one imaging is generated by a non-linear optical path.

Embodiment 9

Optics system in accordance with preceding embodiments, wherein conductor traces are integrated in the substrate.

Embodiment 10

Optics system in accordance with preceding embodiments, wherein a local structure is introduced into the substrate, the local structure providing for a special characteristic, like high a thermal conductivity for local cooling, "heat pipe", or transparency for local light transmissivity, like "window" or optical gap.

Embodiment 11

Optics system in accordance with preceding embodiments, wherein at least one device is introduced into the substrate with high precision directly when manufacturing the substrate.

Embodiment 12

Optics system in accordance with preceding embodiments, wherein the manufacturing process comprises several sub-steps, which successively result in the 3D arrangement (folding up corners, then folding the sides; see FIGS. 3A to 3F).

Embodiment 13

Optics system in accordance with preceding embodiments, wherein the substrate comprises all the lateral areas of the system in one part.

Embodiment 14

Optics system in accordance with preceding embodiments, wherein the substrate is transferred to the system and the same is closed by another element (lid).

Embodiment 15

Optics system in accordance with preceding embodiments, wherein a specially embodied sub-region of the substrate interacts with a device and thereby obtains an advantageous function (like mechanical pre-deflection of a movable functional element).

Embodiment 16

Optics system in accordance with preceding embodiments, wherein openings in the casing allow for a gas exchange. If applicable, the openings are arranged such that the channels forming prevent light from entering.

Using the invention just described and disclosed, a planar or at least approximately planar substrate may be implemented such that, after mounting the devices by a corresponding mounting tool, sub-regions can be tilted along lines/edges provided—pre-formed in the substrate, particularly characterized by implementation, bendable, . . . —desired tilting angles and positions may be produced mechanically by stops without performing an adjustment.

Additionally, using the invention just described and disclosed, the (folded/complex) optical path can set autonomously.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method comprising:
providing a substrate comprising a first and a second substrate region,
providing a first device in the first substrate region and providing a second device in the first substrate region or in the second substrate region, and
bending the substrate along at least one bending edge in order to achieve a three-dimensional body,
wherein the first device and the second device are oriented to each other by the bending in order to provide a communications path between the same
wherein bending the substrate results in a three-dimensional body which is closed on all its sides by individual substrate regions of the substrate.

2. The method in accordance with claim 1, wherein the two devices are provided on the respective substrate regions before bending such that, after the bending, the result is an optical path of radiation transmitted between the two devices within the three-dimensional body such that the optical path propagates from the radiation-emitting device along a direct or indirect path to the radiation-receiving device.

3. The method in accordance with claim 1, wherein at least one limitation structure is provided on the substrate, the structure, when bending the substrate, limiting the magnitude of the change in position of the respective folded substrate region.

4. The method in accordance with claim 1, wherein at least one opening is formed in one of the substrate regions and the at least one opening is implemented such that electromagnetic radiation and/or sound waves may pass in order to provide for an exchange of electromagnetic radiation and/or sound waves between the three-dimensional body and the environment.

5. The method in accordance with claim 1, wherein at least one opening is provided in one of the substrate regions, through which gas may be exchanged between the three-dimensional body and the environment, and wherein the opening is additionally optionally configured to attenuate and/or prevent light from entering into the three-dimensional body.

6. The method in accordance with claim 1, wherein a local structure comprising high a thermal conductivity for local cooling or transparency for local light transmissivity is introduced into at least one substrate region.

7. The method in accordance with claim 1, comprising:
manufacturing the substrate using a planar technology such that at least one of the two devices is provided at the respective substrate section already when manufacturing the substrate.

8. The method in accordance with claim 1, wherein, before bending the substrate, at least one conductive trace is introduced into the substrate using planar technology, wherein the conductive trace extends over at least two substrate regions and, when bending the substrate, is bent, with no destruction caused, together with the substrate regions.

9. The method in accordance with claim 1, wherein the substrate is processed using a laser-based method for thinning to obtain the bending edge.

10. A method comprising:
providing a substrate comprising a first and a second substrate region,
providing a first device in the first substrate region and providing a second device in the first substrate region or in the second substrate region, and
bending the substrate along at least one bending edge in order to achieve a three-dimensional body,
wherein the first device and the second device are oriented to each other by the bending in order to provide a communications path between the same, wherein the communications path is an optical path along which electromagnetic radiation or acoustic radiation in the form of waves propagates,
wherein the two devices are provided on the respective substrate regions before bending such that, after the bending, the result is an optical path of radiation transmitted between the two devices within the three-dimensional body such that the optical path propagates from the radiation-emitting device along a direct or indirect path to the radiation-receiving device, and
wherein bending the substrate results in a three-dimensional body which is closed on all its sides by individual substrate regions of the substrate.

11. An apparatus comprising:
a substrate comprising a first and a second substrate region,
a first device provided in the first substrate region and a second device provided in the first or in the second substrate region,
wherein the substrate comprises at least one bending edge and the substrate is bent along said bending edge and consequently is implemented as a three-dimensional body,
wherein the first device and the second device are oriented to each other such that a communications path between the same is formed within the three-dimensional body
wherein the three-dimensional body is closed on all its sides by individual substrate regions of the substrate.

12. The apparatus in accordance with claim 11, wherein the first substrate region and the second substrate region are defined by the bending edges.

13. The apparatus in accordance with claim 12, wherein the individual substrate regions are formed integrally with one another and are in contact with one another at the bending edges.

14. The apparatus in accordance with claim 11, wherein at least one limitation structure is provided on the substrate which, when bending the substrate, limits the magnitude of the change in position of the respective bent substrate region.

15. The apparatus in accordance with claim 11, wherein the two devices are optical functional elements or micro-mechanical MEMS functional elements or acoustic functional elements.

16. The apparatus in accordance with claim 11, wherein the two devices are optical functional elements and a prism is arranged in an optical path between the two devices.

17. The apparatus in accordance with claim 11, comprising a MEMS-grating; wherein the two devices are optical functional elements which together and with the MEMS-grating form a grating spectrometer or a grating spectrograph or a grating monochromator.

18. The apparatus in accordance with claim 11, wherein the two devices are optical functional elements which, when communicating with each other, form an optical off-axis system comprising an off-axis optics and comprising a non-linear optical path.

19. The apparatus in accordance with claim 11, wherein at least one of the substrate regions comprises an opening, wherein the at least one opening is configured such that electromagnetic radiation and/or sound waves may pass in order to provide for an exchange of electromagnetic radiation and/or sound waves between the three-dimensional body and the environment.

20. The apparatus in accordance with claim 11, wherein at least one of the substrate regions comprises an opening through which gas may be exchanged between the three-dimensional body and the environment, and wherein the opening is additionally configured to attenuate and/or prevent light from entering into the three-dimensional body.

21. The apparatus in accordance with claim 11, wherein at least one substrate region comprises a local structure which comprises high a thermal conductivity for local cooling or transparency for local light transmissivity.

22. The apparatus in accordance with claim 11, wherein the substrate comprises at least one conductive trace which extends over at least two bent substrate regions.

23. The apparatus in accordance with claim 11, wherein the substrate comprises at least one section which is processed using a laser-based method for thinning to obtain the bending edge.

24. An apparatus comprising:
a substrate comprising a first and a second substrate region,
a first device provided in the first substrate region and a second device provided in the first or in the second substrate region,
wherein the substrate comprises at least one bending edge and the substrate is bent along said bending edge and consequently is implemented as a three-dimensional body,
wherein the three-dimensional body is closed on all its sides by individual substrate regions of the substrate, and
wherein the first device and the second device are oriented to each other such that a communications path between the two devices forms within the three-dimensional body, wherein the communications path is an optical path along which electromagnetic radiation or acoustic radiation in the form of waves propagates,
and wherein the communications path propagates from the radiation-emitting device along a direct or indirect path to the radiation-receiving device.

* * * * *